US010178158B1

(12) United States Patent
Bee et al.

(10) Patent No.: US 10,178,158 B1
(45) Date of Patent: Jan. 8, 2019

(54) TRENDING MEDIA CONTENT IN AN ONLINE MEMBERSHIP GROUP

(71) Applicant: Amazon Technologies, Inc., Seattle, WA (US)

(72) Inventors: Christopher Brian Bee, San Francisco, CA (US); Lyle Stephen Hansen, III, El Cerrito, CA (US)

(73) Assignee: Amazon Technologies, Inc., Seattle, WA (US)

(*) Notice: Subject to any disclaimer, the term of this patent is extended or adjusted under 35 U.S.C. 154(b) by 107 days.

(21) Appl. No.: 14/735,031

(22) Filed: Jun. 9, 2015

(51) Int. Cl.
H04L 29/08 (2006.01)
H04L 29/06 (2006.01)
G06F 17/30 (2006.01)

(52) U.S. Cl.
CPC ........ *H04L 67/10* (2013.01); *G06F 17/30058* (2013.01); *H04L 65/4069* (2013.01)

(58) Field of Classification Search
CPC .......... G06F 17/30864; G06F 17/3082; G06F 3/0482; G06F 17/30053; G06F 17/30174; G06Q 50/01; G06Q 30/02; H04L 65/60; H04L 67/10; H04L 67/42; H04L 65/4084; H04L 67/1095; H04L 12/1822; H04L 51/32; H04L 67/04; H04L 67/06; H04L 67/22; H04L 67/26
See application file for complete search history.

(56) References Cited

U.S. PATENT DOCUMENTS

| 9,524,487 | B1* | 12/2016 | Yagnik | G06Q 30/00 |
| 2009/0271588 | A1* | 10/2009 | Barsness | G06F 9/5022 711/170 |
| 2012/0059825 | A1* | 3/2012 | Fishman | G06F 17/30053 707/737 |
| 2013/0097176 | A1* | 4/2013 | Khader | G06Q 30/0282 707/748 |
| 2013/0246522 | A1* | 9/2013 | Bilinski | H04N 21/4758 709/204 |
| 2013/0275195 | A1* | 10/2013 | Gabryelski | G06Q 30/0225 705/14.26 |
| 2014/0207733 | A1* | 7/2014 | Ghuneim | G06F 17/30554 707/609 |
| 2014/0297655 | A1* | 10/2014 | Paglia | H04L 67/22 707/748 |
| 2014/0359647 | A1* | 12/2014 | Shoemake | H04N 5/23206 725/10 |
| 2016/0110795 | A1* | 4/2016 | Farrar | G06Q 50/01 705/26.7 |

* cited by examiner

Primary Examiner — Ninos Donabed
(74) Attorney, Agent, or Firm — Thorpe North & Western, LLP

(57) ABSTRACT

Technology is described for trending media content in an online membership group. A frequency rate and velocity rate for media file interest may be determined for a media file added to one or more virtual collections in the online membership group during a predetermined period of time. Trending media files are identified according to the according to the frequency rate and the velocity rate determined for each media file added to the one or more virtual collections. Ranking information relating to the trending media files may be displayed on a graphical user interface (GUI) for the one or more virtual collections in the online membership group.

18 Claims, 7 Drawing Sheets

TRENDING MEDIA CONTENT IN AN ONLINE MEMBERSHIP GROUP

BACKGROUND

In recent years, digital media has emerged and introduced customers to a new way to acquire and consume many types of digital media including music, video, books, magazines, games and other types of digital media. The digital medium gives customers instant access to digital media items via electronic networks, such as the Internet. Customers may access, purchase, stream, and/or download digital media to portable electronic devices or other computing devices.

Many customers may be associated with an online membership group that provides access to various types of media items (e.g., video, music, e-books and other subscription-based, purchase oriented, rental based, or other membership groups) and may consume and interact with numerous types of media content. For example, the customer may consume a large amount of songs and audio books, movies and television programs, books, magazines, and newspapers, electronic games, etc., as part of the online membership group. In addition, the customer may interact with the digital media using a variety of electronic devices, such as mobile devices, tablet computers, e-book readers, laptops, televisions, desktop computers, etc. The online membership group and electronic devices may allow the customer to interact with digital versions of the digital media. Moreover, a customer may desire to share, add, delete, remove, purchase or rent digital versions of the digital media items based on current trends and popular media content. For example, the customer may desire to know the most popular current digital media items (e.g., songs or videos) being downloaded and consumed by other customers in the online membership group.

DETAILED DESCRIPTION

Figure 1:
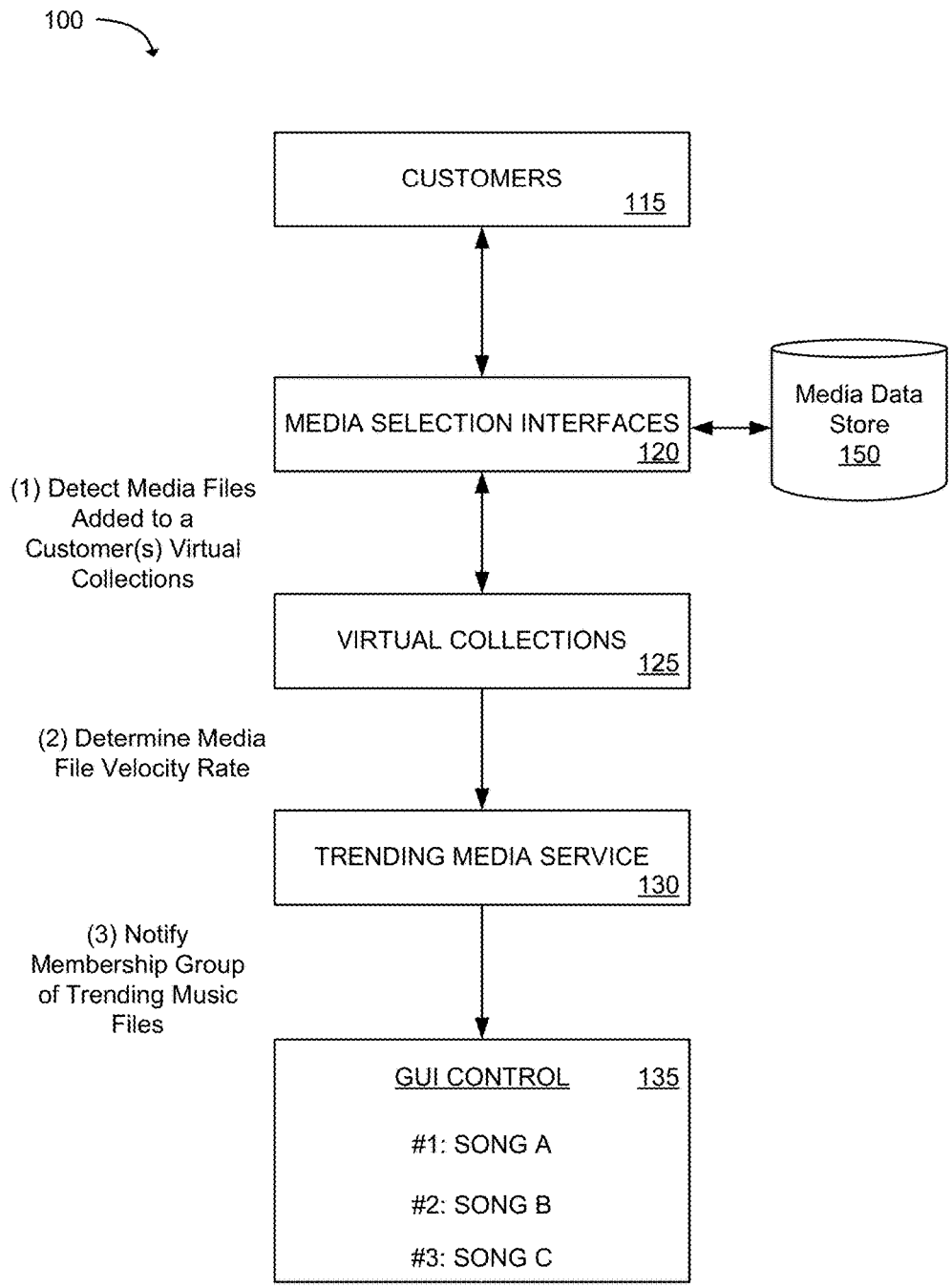
FIG. 1 illustrates a system for identifying and displaying trending media content in an online membership group according to an example of the present technology.

A technology is described for presenting trending media content to customers in an online membership group. Customers may add a media file to the customer's virtual collection of media files, which may indicate interest in a file, and then this interest may be recorded for the online membership group. The trending media content may be electronic music, videos, books, games, or other trending media content. In one example, a customer may be identified who is adding music to a virtual music collection and the addition of music files to the customer's virtual music collection may be tracked on a group basis for the customers in the online membership group.

A frequency rate and/or velocity rate of media interest for each media file being added to one or more virtual collections in the online membership group (e.g., to virtual collections of media files by each individual customer) may be determined. Trending media files may be identified according to the determined frequency rate and/or the velocity rate for the individual media files. Each customer, such as a user, member, or client, in the online membership group may be notified of the trending media files. Information relating to the trending media may be displayed on a graphical user interface provided to the customers in the online membership group. For example, the graphical customer interface may be a graphical display control or graphical display widget using a list that may display a ranking of media file names that are highly ranked and/or trending (e.g., a velocity at which the rank of the media files is increasing).

In one example, a frequency rate and velocity rate for media file interest may be determined for a media file added to one or more virtual collections in the online membership group during a predetermined period of time. Trending media files may be identified according to the ranked frequency rate and the ranked velocity rate determined for each media file added to the one or more virtual collections. Ranking information relating to the trending media files may be displayed on a graphical user interface (GUI) for the one or more virtual collections in the online membership group.

An activity increase in the frequency rate and/or the velocity rate may be detected for the media files being added to the one or more media collection managers associated with the online membership group. Each frequency rate and each velocity rate calculated for each media file added to the one or more media collection managers associated with the online membership group may be collected As a more specific example in the case of music, a technology is described for detecting trending media files, such as music files that are being added to one or more customer media libraries (i.e., a virtual collection). For example, a customer may be associated with an online membership group where media files may be added (e.g., added, downloaded, streamed, purchased, rented, as well as programmed into streaming services such as Internet radio streams, where a stream of preselected content is streamed to customer). The present technology may provide for discovering, for example, what is popular or "now trending" in music amongst an online membership group by determining what other customers are adding to each customer's online membership group media library during a specific time period. The ranking or trending results may be collected from one or more customer media libraries (or virtual collections), and the trending results may be capable of being sent to or published to one or more customers across different electronic platforms, including mobile devices such as smart phones, tablets, laptops, personal music players and the like. As used herein, "trending" may refer to media content that is a current style, interest, or showing a general tendency, trend, and/or incline. Popularity may refer to media that is: favored, widely liked, appreciated, liked by a predefined percentage of customers within a defined group, liked by acquaintances, reflecting a taste or acceptance by or prevalent amongst a group, such as the online membership group.

The technology may provide for trending media content in an online membership group. A customer may be identified in an online membership group. A frequency rate, for which each media file is being added during a predefined period of time to one or more virtual collections in the online membership group, may be determined. The frequency rate may represent an aggregate number of times a media file has been added to the one or more virtual collections in the online membership group during a predefined period of time or during a total amount of time since the media file has been available to the online membership group. A velocity rate may also be determined. The velocity rate may represent a rate of change that a media file is being added to and/or removed from one or more virtual collections in the online membership group during a predefined period of time (e.g., how fast a song is being added by one or more customers to one or more virtual collections in the online membership group during the predetermined time period).

Moreover, an activity increase or "activity acceleration" rate may also be determined. The activity increase may include detecting an overall aggregate increase in a media file rate being added to one or more virtual collections in the online membership group. For example, a media file may become increasingly popular and customers may increasingly add the media file to their virtual collections. As such, the activity increase of the media file being added to one or more virtual collections in the online membership group may be detected. The activity increase may represent the aggregate number of how many times the media file has been added to one or more virtual collections in the online membership group during a predetermined period of time. Alternatively, the activity increase or "activity acceleration" rate may also represent a rate of change of the velocity rate in a predetermined time period. For example, as a media file may become increasingly popular, customers may increasingly add the media file to their virtual collections. Hence, the rate of change of the velocity rate may change and begin to rapidly increase or decrease during a predetermined period of time. In one aspect, the activity increase of the frequency rate and/or the velocity rate for a media file being added to the one or more media collection managers associated with the online membership group may be determined. The frequency rate and the velocity rate calculated for each media file added to the one or more media collection managers and/or the virtual collections associated with the online membership group may also be collected. A list of ranked frequency rates and the velocity rates may be collected from each frequency rate and each velocity rate that that has been collected.

In one aspect, the virtual collections may be digital media libraries, virtual libraries, and/or media libraries of a customer's account. Trending media files, such as music or video, may be identified according to the determined frequency rate for each of the media files. The frequency rate may include one or more of: an overall number of times each media file has been added to each customer's media library in the online membership group, a number of times a file has been added to each customer's media library in the online membership group in a pre-defined period of time, a rate of change in which the media file has been added in real time or a predefined period of time to one or more customer's media libraries in the online membership group and/or a rate of change of the media file's frequency ranking. For example, the technology provided may determine the rate at which a media file, such as a music artist's most recent released song, is being uploaded by one or more customers (e.g., membership) of the online membership group during a first pre-determined period of time. Subsequently, during a second pre-determined period of time, the technology may detect a rate of change of media file interest (e.g., a velocity rate depicting an increase or a decrease) in the media file being added to one or more customer's media library in the online membership group.

For example, during the first pre-determined period of time the media file may have been added to over one hundred thousand customer media libraries. However, during the second pre-determined period of time the media file may have been added to one million customer media libraries. The technology would detect the rate of change of media file interest during the two time periods and detect the media file or song is active, popular, and is "now trending" in the online membership group. One or more of the customers in the online membership group may be notified of the trending media files. Information relating to the trending media may be displayed on a display control, such as a digital ticker, of a graphical user interface for one or more of the customers in the online membership group.

In one aspect, one or more media files may be identified and/or labeled as a trending media file(s) (e.g., "hot media file" or "now trending media file") upon the one or more media files having a velocity rate greater during a current predetermined time period (e.g., the present time relative to a past period of time) than the velocity rate during one or more previous time periods.

In another aspect, one or more media files may be identified and/or labeled as a trending media file(s) (e.g., "hot media file" or "now trending media file") upon the one or more media files having a frequency rate greater during a current predetermined time period (e.g., the present time relative to a past period of time) than the frequency rate during one or more previous time periods.

Also, a media file may be labeled as a trending media item when the media file has a larger activity increase in a rate of change of the frequency rate and the velocity rate as compared to an another media file having a smaller activity increase in the rate of change of one of the frequency rate and the velocity rate. Information related to the labeled trending media items may be sent to at least one customer in the online membership group information. The information sent to customers relating to trending media files may be displayed in at least one of a content site, a display ticker, a pop-up window, a ranked list, or a short message service (SMS) message.

FIG. 1 illustrates a system 100 for presenting trending media content for an online membership group according to an example of the present technology. The system 100 may include one or more customers 115 (illustrated, by way of example only, in FIG. 1 as one customer), media selection interfaces 120, virtual collections 125, a trending media service 130, a graphic user interface or a GUI control 135 (such as a display ticker or ranking list control), media data store 150, such as an electronic retail store.

In one aspect, the customer 115 or customers may access a media file, such as a song, e-book, or video, in the media data store 150 via the media selection interfaces 120. The media file may then be added to a virtual collection(s) 125 (e.g., a virtual media file library, playlist, station, etc.) associated with the customer 115. In one example configuration of the present technology, the media file is 1) detected as being added to the customer's 115 virtual collection 125. Upon the occurrence of the media file being added to a customer's 115 virtual collection 125, 2) a media file velocity rate of the media files added to one or more virtual collections 125 of one or more customers 115 is determined. If a media file is determined to be trending media 130, 3) one or more customers in the online membership group may be notified of the trending media 130 using the GUI control 135. The trending media 130 may also be ranked according to one or more predetermined factors, such as the media velocity rate, popularity, length of time a music file has been detected as "trending media," an activity increase affecting the velocity rate in a music file being added or removed from virtual collections 125, and/or customer profiles.

In one configuration, the media content in the media data store 150 may be accessible to a number of client devices (e.g., desktop computer, laptop or notebook computer, tablet computer, smartphone, smart TV, etc.) of the customer 115, and the customer 115 may access the media data store 150 using the media selection interfaces 120 provide via electronic pages and page servers accessible to the client devices. The media data store 150 may be operated by a business that offers a number of products via an electronic store front (e.g., an electronic retail site) accessible over a communications network, such as the Internet.

The media data store 150 may include Digital Rights Management (DRM) in the media content when delivering a digital asset, including, but not limited to, audio, video, books, or other content over an internet protocol (IP) network, and the delivery may use media selection interfaces 120 to provide the digital asset to a device associated with the customer 115, in such a way that a distributor of the media content can control how that content is used. For example, the customer 115 may accepts the media contents terms of the contract by acknowledging the Distributor's Terms of Service (TOS) by "clicking" on the appropriate icon on the distributor's portal within the online membership group of the system. The DRM that controls the digital asset includes an embedded technological restrictive component requiring compliance with the TOS.

The customer 115 may add media content from the media data store 150 to the virtual collection(s) 125 associated with the customer 115. In other words, the media data store 150 may provide access to the media content to enable a customer to include or link to the media content in a customer's virtual collection(s) 125 (e.g., a virtual media library available to the customer 115 for interacting with the media content). In one example, the customer 115 may access the media data store 150 using a client device via the media selection interfaces 120 and perform a product search of the media data store's 150 media content catalog using a media data store's 150 search engine. The media content catalog may include media content (i.e., songs, videos, podcasts, audio books, and the like) that the catalog of the media data store 150 offers to the customer to use, add, purchase, interact with, stream, and/or download to the virtual collections 125.

As stated above, each time the customer 115 adds a media file to the virtual collections 125 a detection operation may recognize and detect the media file as being added to the customer's 115 virtual collection(s) 125. These detected operations are aggregated for the online membership group. After associating and adding the media content to the virtual collections, a velocity rate (e.g., a rate of change of media file interest) may be determined for the media content for determining popular and trending media files. In other words, each time a media file is added to the virtual collection(s) 125, a rate of change of media file interest may be determined representing a rate for how many times each media file is being added or deleted during a predetermined period of time to one or more virtual collections 125 in the online membership group. For example, during a predetermined time interval, such as 5 minutes, a music file may have been added to one or more virtual collections 125 of multiple customers 115. If the music file is added to 5 virtual libraries, the rate of change of how many times the music file has been added to or even removed from the virtual collections 125 over the predetermined time interval may be determined. Next, during a second predetermined time interval, the rate of change of media file interest may increase and/or decrease. For example, the second predetermined time interval may be the next 5 minutes immediately after the 5 minutes of the first predetermined time interval. During the second predetermined time interval, the music file may have been added to 365 virtual collections 125 of multiple customers 115. As such, the music file is detected as a "popular song" and is "now trending" within the online membership group. In an additional example, a music file may be new to the media data store 150, and the music file may be accessed by one or more customers in the online membership group within a predetermined time interval from the release of the music file. In this example, the media file's frequency rate and rate of change for media file interest may be greater than 50% of the online membership group adding this music file to the customer's virtual collections 125. (It should be noted that in one aspect, for the given example, the term "popular" may be predefined as being equal to or greater than a rate of change of media file interest equal to or greater than twenty five percent (25%) of customers accessing a media file in the online membership group). As such, the music file is detected as "popular" and "now trending" within the online membership group.

Each media file detected as "popular" and "now trending" within the online membership group may be ranked. The ranked media files may then be communicated to customers 115 in the online membership group by displaying information relating to the trending media 130 in the GUI control 135. The GUI control 135 may be configured to display the trending media in a scrolling presentation (e.g., side scrolling or vertical scrolling) or list presentation on the display of the target device.

As an example, the GUI control 135 may display the trending media 130 in scrolling presentation on the display of a target device list with the top 3 currently trending songs, such as "#1: Song A, #2: Song B, and #3: Song C." In a further example, an electronic page containing the GUI control 135 may display the trending media 130 in a scrolling presentation on the display of a target device list with the top 3 currently trending songs, such as "#1: Song A, #2: Song B, and #3: Song C."

Figure 2:
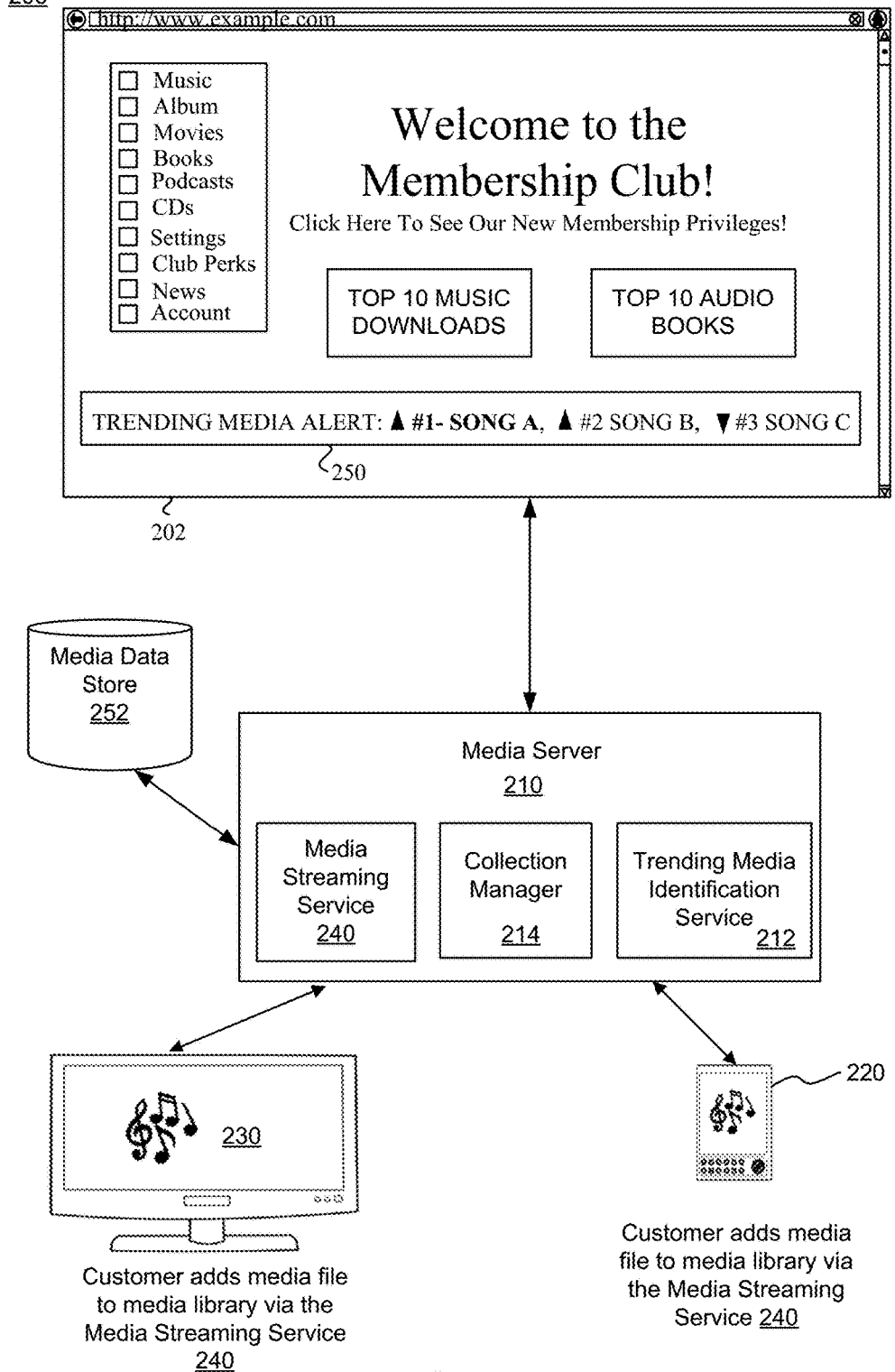
FIG. 2 illustrates a system for notifying customers of trending media on a content site in an online membership group according to an example of the present technology.

FIG. 2 illustrates a system 200 for notifying customers on a content site in an online membership group of trending media according to an example of the present technology. The system 200 may include a media server 210, a media streaming service 240, a collection manager 214 (e.g., media collection manager), a trending media identification service 312, a media data store 252, a content site 202 accessible through a browser and having a graphical user interface (GUI) for displaying a GUI control 250 (e.g., an interactive digital display ticker), and target devices 220, 230 for displaying the content site 202 and/or consuming the media files added to collection manager 214 from the media data store 252.

In one aspect, the media server 210 may include the media streaming service 240, the collection manager 214, the trending media identification service 212, and the media data store 252. Alternatively, the media streaming service 240, the collection manager 214, the trending media identification service 212, and the media data store 252 may be independently (e.g., remotely) located from the media server 210. For example, the media streaming service 240 may be remotely located on each target device 220, 230 and in communication with the media server 210, whereas the media data store 252 and the trending media identification service 212 may be at least partially located on the media server 210 and/or at least partially remotely located from media server 210.

Media files may be stored in the media data store 252. The customer may add a media file from the media data store 252 to the collection manager 214. Alternatively, a reference link to the media file may be added to the collection manager 214. The media server 210, in association with the trending media identification service 212, may detect the media file being added to the collection manager 214. The trending media identification service 212 may calculate a rate of media file interest (e.g., frequency, velocity or an activity increase) for media files being added to one or more of the collection managers 214 (e.g., each customer may have an individual collection manager 214, which may store the virtual collections and rankings list, and/or the collection manager 214 may be configured to associate each added media file with each individual customer) in an online membership group. In other words, the trending media identification service 212 may determine a rate of media file interest for each media file as the media file is added to the collection manager 214 (during a predetermined period of time) for one or more customers in an online membership group. In one aspect, the trending media identification service 212 may detect an activity increase in the rate of media file interest for at least one of the media files being added to collection manager 214 of the one or more customers.

The trending media identification service 212 may identify trending media files according to the determined rate (e.g., frequency rate and/or the velocity rate) for each of the media files. For instance, the trending media identification service 212 may rank the trending media according to the calculated frequency rates (e.g., frequency rate and/or the velocity rate of media file interest). For example, the ranking of the trending media may include one or more ranking factors, such as total popularity, the rate of increase of interest in the media file, length of time a media file has been detected as "trending media," an activity increase in a media file being added or removed from the collection manager 214, and/or customer profiles.

In one aspect, the trending media identification service 212 may collect each frequency rate and/or the velocity rate that has been calculated for each media file being added to the collection manager 214. The trending media identification service 212 may then rank each of the calculated frequency rates and/or the velocity rates of media file interest, which have been collected, for each of the media files being added from the media data store 252 to the one or more collection manager 214. A list of the ranked frequency rates and velocity rates may be created by the trending media identification service 212 for each of the trending media files.

For example, a larger value may be assigned to 1) larger calculated frequency rates and/or the velocity rates of media file interest as compared to a smaller calculated frequency rates and/or the velocity rates of media file interest for media files, 2) media files that are added to at least N % (e.g., 25% or 50%) of the collection manager 214 for one or more customers in the online membership group, 3) media files having greater activity increase of the frequency rates and/or the velocity rates of media file interest being added at a faster rate to the collection manager 214 from the media data store 252 during a predetermined time period as compared to other media files being added during a predetermined period of time at a slower frequency rate and/or the velocity rate of media file interest to the collection manager 214 from the media data store 252 during the predetermined time period, 4) media files having been detected as popular for a longer period of time as compared to other media files being detected as popular for a shorter period of time, 5) media files having been detected as popular based on a customer's profile as compared to other media files being not detected as popular based on the customer's profile, and/or 6) media files having a been detected as popular based on the detected and calculated frequency rate and/or the velocity rate of media file interest based on downloads, number of times played or streamed, and/or purchased.

The trending media identification service 212 may also notify customers in the online membership group of the trending media files in the content site 202, such as using a browser having a graphical user interface (GUI) for displaying information relating to the trending media on the GUI control 250, such as a display ticker or display list.

For example, if the trending media is displayed on the GUI control 250, the GUI control 250 may present items related to the trending media when the trending media has reached a defined rate of media file interest. Depending on the relative ranking of the trending media, the GUI control 250 may place on such information about the trending media in one or more various viewing arrangements. The GUI control 250 may define certain priorities or display preferences that dictate whether the trending media is displayed at all, and if so, how it is displayed. In one aspect, the GUI control 250 may generate a horizontal display of an interactive ticker that can scroll left or right, a vertical display of an interactive control that can scroll up or down, a display of the ticker at the top, bottom, left, or right of the content site 202, and/or in any other position, size, and/or display configuration. Alternatively, the GUI control 250 may have semi-static data that is only updated periodically and does not scroll (e.g. updated every 5 or 10 minutes).

The GUI control 250 may include data positions that are each a placeholder for selectable ticker data of the trending media displayed in the GUI control 250. Specifically, the ticker data in the GUI control 250 may be interactive on the GUI control 250 configured to be selected. For example, the ticker data may be a ranked song listed as #1. The customer may select the ranked song. Upon selecting the ranked song, information, such as the ability to add, purchase, download, or share, may be viewed in an alternative GUI window, pop up box, and/or content site. In one aspect, the data of the trending media may be selectable ticker data and can include any one or combination of text, images, selectable links, and/or video streams.

For example, assume that several hundred customers add "song A" from the media data store 252 to each of the customers' respective collection manager 214. The rate of media file interest in the media file "song A" may be continuously calculated each time song A is added to each collection manager 214. Since the rate of media file interest in song A is being added during a predetermined period of time to the customer's collection manager 214, song A may be detected as "popular" and/or "now trending for the online membership group. Song A may be detected as "popular"

and/or "now trending and is added at a greater frequency rate and/or the velocity rate than other songs, such as song B, being added during the predetermined period of time to the collection manager 214 for the online membership group. For instance, song A may be detected as the most popular and may be ranked in the #1 (first) position. Also, an indication marker, such as an upward pointing arrow (or other designated symbol or marker) may be placed adjacent to the "#1" ranked position in the GUI control 250 indicating the popularity or trending of song A is rising or increasing. In one aspect, song B is ranked #2 also with an upward pointing arrow placed adjacent to the "#2" ranked position indicating the popularity or trending of song B is rising or increasing. However, it should be noted that song B may have been previously ranked #3 in a previously predefined time period and/or previously ranked by a calculated rate of change of media file interest. Moreover, song C may be ranked #3 (e.g., the third most popular or "now trending" song) but with a downward pointing arrow placed adjacent to the "#3" ranked position indicating the popularity or trending of song B is falling or decreasing. Thus, song C may have been ranked higher than the #3 ranking and may have fallen from ranking #1 or ranking #2 and is currently ranked #3. Alternatively, a previous ranking for song C may still have been in the #3 ranking, but the rate of media file interest for song C may have changed (e.g., during a first predetermined time period, 500 customer's may have added song C to the customer library whereas during a second predetermined time period song C may have had only 300 customer's add song C to each respective collection manager 214. However, overall, as compared to other ranked media files, during the second predetermined time period, song C still maintains the top #3 ranked positions. As such, in one aspect, the GUI control 250 may display a change relative to a previous ranking while also displaying a current most ranking during each trending media alert notification.

In the trending media identification service 212, each of the popular or "now trending" media files listed in a graphical user interface (GUI) control may allow a customer to add any of these trending media files to the collection manager 214. As such, a customer is provided the flexibility to interact with the trending media data within the GUI control (e.g., display ticker) and select one or more of the trending media data list items representing the trending media files for adding the trending media files to the customer library. Thus, the media server 210, in association with the media streaming service 240, may send a stream of the trending media files (e.g., media tracks) to a target device, such as target device 220 and/or 230 of the customer to enable the consumption of a digital media station, such as a digital music station, containing the trending media files selected by the customer from the GUI control 250. The target devices 220, 230 may receive a stream of a personalized digital media station from the media streaming service 240 containing the ranked stream of the popular and "now trending" media items according to the trending media identification service 212.

The media server 210 may authenticate at least one target device, such as target devices 220, 230 to receive content from the media streaming service 240 (e.g., a digital music station) containing the ranked stream of the popular and "now trending" media items according to the trending media identification service 212. The media server 210 may also update the popular and "now trending" media items according to the trending media identification service 212 at predefined intervals for re-ranking and providing updated notifications to one or more customers in the online membership group according to the trending media.

In one aspect, the target devices 220, 230 may use an application such as a browser to display the content site 202. Further, each target device 220, 230 may be associated with the online membership group, and the online membership group may be associated with at least an online membership group or a social media network. Accordingly, the media server 210, in association with the trending media identification service 212 may determine the rate of media interest of the media files as the media files are added to the collection manager 214.

Figure 3:
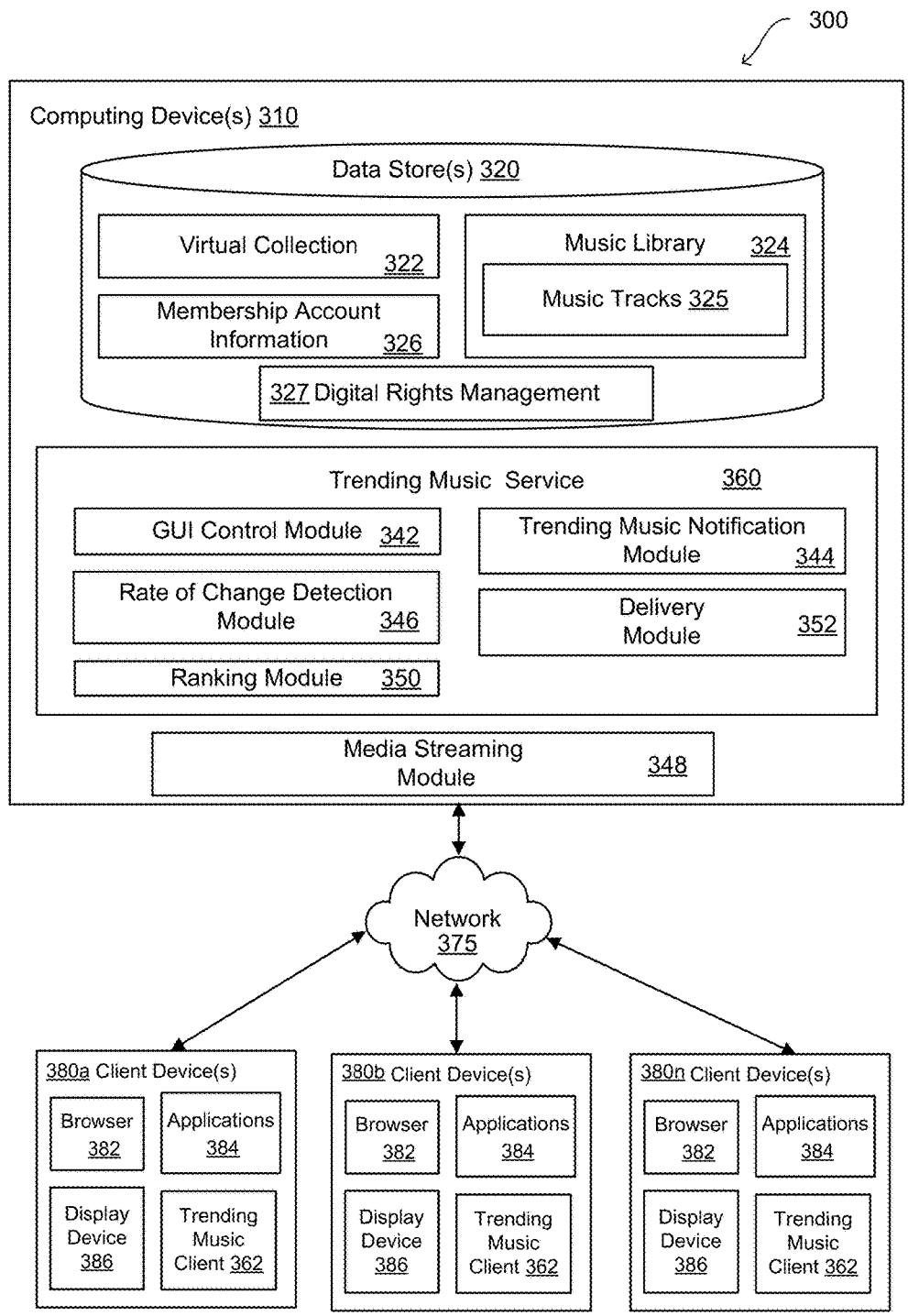
FIG. 3 illustrates a system for trending media content in an online membership group according to an example of the present technology.

In the following discussion, a general description of an example centralized system for identifying trending media files being added to a collection manager of a customer in an online membership group and notifying customers on content sites and/or target devices in association with the online membership group is provided. The general description is followed by a discussion of the operation of the components in a system for the technology. FIG. 3 illustrates a system for trending media content in an online membership group according to an example of the present technology. FIG. 3 illustrates a networked environment 300 according to one example of the present technology. The networked environment 300 may include one or more computing devices 310 in data communication with a client device 380*a-n* (illustrated in FIG. 3 as one or more client devices, such as client devices 380*a*, 380*b*, and 380*n*) by way of a network 375. The network 375 may include the Internet, intranets, extranets, wide area networks (WANs), local area networks (LANs), wired networks, wireless networks, or other suitable networks, etc., or any combination of two or more such networks.

Various applications, services and/or other functionality may be executed in the computing device 310 according to varying configurations. Also, various data may be stored in a data store 320 that is accessible to the computing device 310. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data stored in the data store 320, for example, may be associated with the operation of the various applications and/or functional entities described below.

The data stored in the data store 320 may include a list of available virtual collections 322 (e.g., one or m or collection managers). The list of available virtual collections 322 may include music tracks 325 or electronic links to music tracks 325 added from the media library 324 and associated with one or more membership accounts. The list of available virtual collections 322 may be associated with the membership accounts 326 of a customer accessing the computing device 310 and authenticating the client devices 380*a-n*. The list of available virtual collections 322 may be tailored to or specific to the each membership accounts 326. The membership accounts 326 may be duplicated in the digital rights management service 327 of the data store 320 for assisting with the communicating with the trending music service 360 and the client devices 380. Further, the digital rights management service 327 may provide customer provided credentials for accessing the data store 320.

The data stored in the data store 320 may include a media library 324, such as a digital media library containing music, songs, videos, podcasts, CD's, albums, audio books, and/or other media types. The media library 324 may be accessed for adding the music tracks 325 to the virtual collection of each customer. The music tracks 325 may be selected from the media library 324, such as, for example, by using a search query, a media tracks catalog, and/or from a display ticker displaying trending media files.

The membership accounts 326 may be used by a trending music service 360, which may also have access to the music library (e.g., an electronic retail store or a media content provider network). The media library 324 may be used for extracting music track 325 information for displaying trending media tracks being added to the virtual collections 322 and on a variety of electronic devices, such as televisions, mobile devices, mobile phones, game consoles, tablet computers, desktop computers, etc.

The components executed on the computing device 310 may include a GUI control module 342, a trending music notification module 344, an rate of change detection module 346, a media streaming module 348, a ranking module 350, a delivery module 352, and other applications, services, processes, systems, engines, or functionality not discussed in detail herein. The GUI control module 342, the trending music notification module 344, the rate of change detection module 346, the media streaming module 348, and the ranking module 350 may be part of the trending music service 360. Alternatively, the media streaming module 348 may be separate from but associated with the trending music service 360. The trending music service 360 may determine a rate of music track interest for each music track 325 as the music track 325 is added to the virtual collections 322 for one or more customers with membership accounts 326 in the online membership group.

The trending music service 360 may identify, using the trending music notification module 344, trending music tracks 325 according to the determined rate of music track interest for each music track 325. The trending music service 360 may notify one or more customers associated with the membership accounts 326 in the online membership group of the trending media files. The trending music service 360, using the ranking module 350, may rank the frequency rates and/or the velocity rates for each of the media files being added to the one or more media libraries. The trending music service 360, using the ranking module 350, may rank the trending music tracks from the music library and send the rankings to the GUI control 342 for display on a graphical user interface on client devices 380a-n for the one or more customers associated with the membership accounts 326 in the online membership group.

In one aspect, the trending music service 360 may use the rate of change detection module 346 that may be configured to calculate and re-calculate the frequency rate and/or the velocity rate (e.g., a rate of change) of the music track 325 over predetermined time intervals as the music track 325 is added to the virtual collections 322 of customers with a membership account 326 in the online membership group. The rate of change detection module 346 may collect, save, and store each calculated and re-calculated frequency rate and velocity rate for later use and/or comparison. For example, the rate of change detection module 346 may calculate a frequency rate and a velocity rate during a current time period. The calculated frequency rate and/or velocity rate may be compared to one or more previously calculated frequency rates and/or velocity rates for detecting whether the frequency rate and a velocity rate of the current time period is greater than, equal to, and/or less than one or more previously calculated frequency rates and/or velocity rates. In an alternative example, the rate of change detection module 346 may maintain, collect, save, and store a largest calculated frequency rate and/or velocity rate for all previous time periods. Then, the calculated frequency rate and/or velocity rate of the current time period may be compared to the largest calculated frequency rate and/or velocity rate for all combined time periods for detecting whether the frequency rate and a velocity rate of the current time period is greater than, equal to, and/or less than the largest calculated frequency rate and/or velocity rate for all combined time periods.

In one example, a GUI control module 342 may be used to generate and stream trending music identification information, such as in a digital ticker on the GUI control module 342, displaying the trending music tracks in a scrolling fashion on the client devices 380. In one aspect, the delivery module 352 may work in conjunction with the GUI control module 342 for notifying the customer of the trending music tracks on the client devices 380. For example, the GUI control module 342 may issue to the client device 380, via the network 375 and the delivery module 352, a short message service (SMS) message (e.g., a text message), length limited text messages, such as a tweet, or a pop-up message for display on a GUI or content site (see 202 in FIG. 2).

The delivery module 352 and the GUI control module 342 may stream a digital ticker onto the client devices over network 375. The digital ticker may display the ranked trending music files according to the calculated rate of changes of media file interest of the music files being added to the virtual collections for display on the client device 380 that has been authenticated to the membership accounts 326. In addition, the delivery module 352 may be configured for delivering an application, pages, instructions, content, and/or information necessary for the client device 380 to generate and/or stream the digital ticker for notifying one or more customers of the "now trending" music tracks 325.

The media streaming module 348 may be configured to receive updated, trending music files from the media library 324 based upon the trending music notification module 344 and the rate of change detection module 346 that is periodically calculating a rate of change of media file interest for each media track being added to a customer's virtual collection. The delivery module 352 provides the client devices 380 with the updated, trending music tracks in the display ticker.

In addition, the media streaming module 348 and the delivery module 352 may include the functionality to respond to a purchase command, a select command, a play command, a pause command, a seek command, a forward command, a reverse command, or other commands to be performed when the consumption of media files takes place on the client device 380.

The ranking module 350 may be configured to store the ranked frequency rates and/or the velocity rates for the music tracks for a defined period of time. In one example configuration, the ranking module 350 may store identifiers or electronic references for the ranked frequency rates and/or the velocity rates. Available client devices 380 may periodically poll or query the trending music service 360 for current or revised ranked frequency rates and/or the velocity rates for generating and/or updating the display ticker for a most current ranking of trending music tracks. As a nonlimiting example, the client device 380 may poll the trending music service 360 approximately every 15 seconds for outstanding and/or updated ranked trending music tracks identified from the music tracks 325 added to the virtual collection 322. The client device 380 may retrieve the ranked trending music tracks and with the assistance of the digital ticker module, and delivery module 352, may automatically generate and/or reconfigure the digital ticker for the membership accounts 326 as directed by the trending music service 360 based on the trending music tracks.

Certain processing modules may be discussed in connection with this technology and FIG. 3. In one example configuration, a module of FIG. 3 may be considered a service with one or more processes executing on a server or other computer hardware. Such services may be centrally hosted functionality or a service application that may receive requests and provide output to other services or user devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide ongoing access to the module or the third party access may be based on a per transaction access where the third party pays for specific transactions that are provided and consumed.

The computing device 310 may comprise, for example, a server computer or any other system providing computing capability. Alternatively, a plurality of computing devices 310 may be employed that are arranged, for example, in one or more server banks, computer banks or other computing arrangements. For example, a plurality of computing devices 310 together may comprise a clustered computing resource, virtualization server, a grid computing resource, and/or any other distributed computing arrangement. Such computing devices 310 and data stores 320 may be located in a single installation or may be distributed among many different geographical locations. For purposes of convenience, the computing device 310 is referred to herein in the singular. Even though the computing device 310 is referred to in the singular, it is understood that a plurality of computing devices 310 may be employed in the various arrangements as described above.

The client device 380 may be representative of a target device, social media sites, and/or content sites that may be coupled to the network 375. The client device 380 may comprise, for example, a processor-based system such as a computer system. Such a computer system may be embodied in the form of a desktop computer, a laptop computer, personal digital assistants, cellular telephones, smartphones, voice-controlled playback devices (e.g., smart speakers), set-top boxes, network-enabled televisions, music players, tablet computer systems, game consoles, electronic book readers, or other devices with like capability. The client device 380 may be configured to execute various applications such as a browser 382, and/or other applications 384. The applications 384 may correspond to code that is executed in the browser 382 (e.g., web applications). The applications 384 may also correspond to standalone applications, such as networked applications. The applications 384 may include and/or be associated with one or more trending music clients 362 that are executed on the client device 380 as directed by the trending music service 360. Similarly, the delivering module 352 and the trending music notification module 344 may be configured to execute various applications such as Internet applications and web hosting onto the client device 380.

The client device 380 may include or be coupled to a display device 386. The browser 382 may be executed on the client device 380, for example, to access and render network pages (e.g. web pages) or other network content served up by the computing device 310 and/or other servers. The display device 386 may comprise, for example, one or more devices such as cathode ray tubes (CRTs), liquid crystal display (LCD) screens, gas plasma-based flat panel displays, LCD projectors, or other types of display devices, etc. In addition, the display device 386 may include an audio device, tactile device (e.g., braille machine) or another output device to feedback to a customer.

The client device 380 may include or be coupled to a trending music client 362. The trending music client 362 may enable streaming or displaying of the automatic, personalized digital media station generation created at the client device 380 as directed by the trending music service 360. In one configuration, the trending music client 362 may be completely built-in to the client device 380. In one configuration, the trending music client 362 may be partially located on the client device 380 and partially located on the trending music service 360. Alternatively, the trending music client 362 may be remote to both the client device 380 and the trending music service 360.

In one embodiment, the trending music client 362 may be an application functioning on the client device 380 configured to provide a trending music notification to the client device 380. For example, the trending music client 362 may be an application installed on a smart phone. In the event that a rate of change detection module 346 detects, for example, either an activity increase in the frequency rate and/or velocity rate, a notification may be sent to the trending music client 362 from the trending music service 360 via the network. The trending music client 362 may then provide, for example, and audio and/or a visual alert to the client device 380. The trending music client 362 may publish or display the alert notification in a content site, a display ticker, a pop-up window, and/or short message service (SMS) message (e.g., a text message) or other message of limited length, such as a tweet, on the client device 380.

Figure 4:
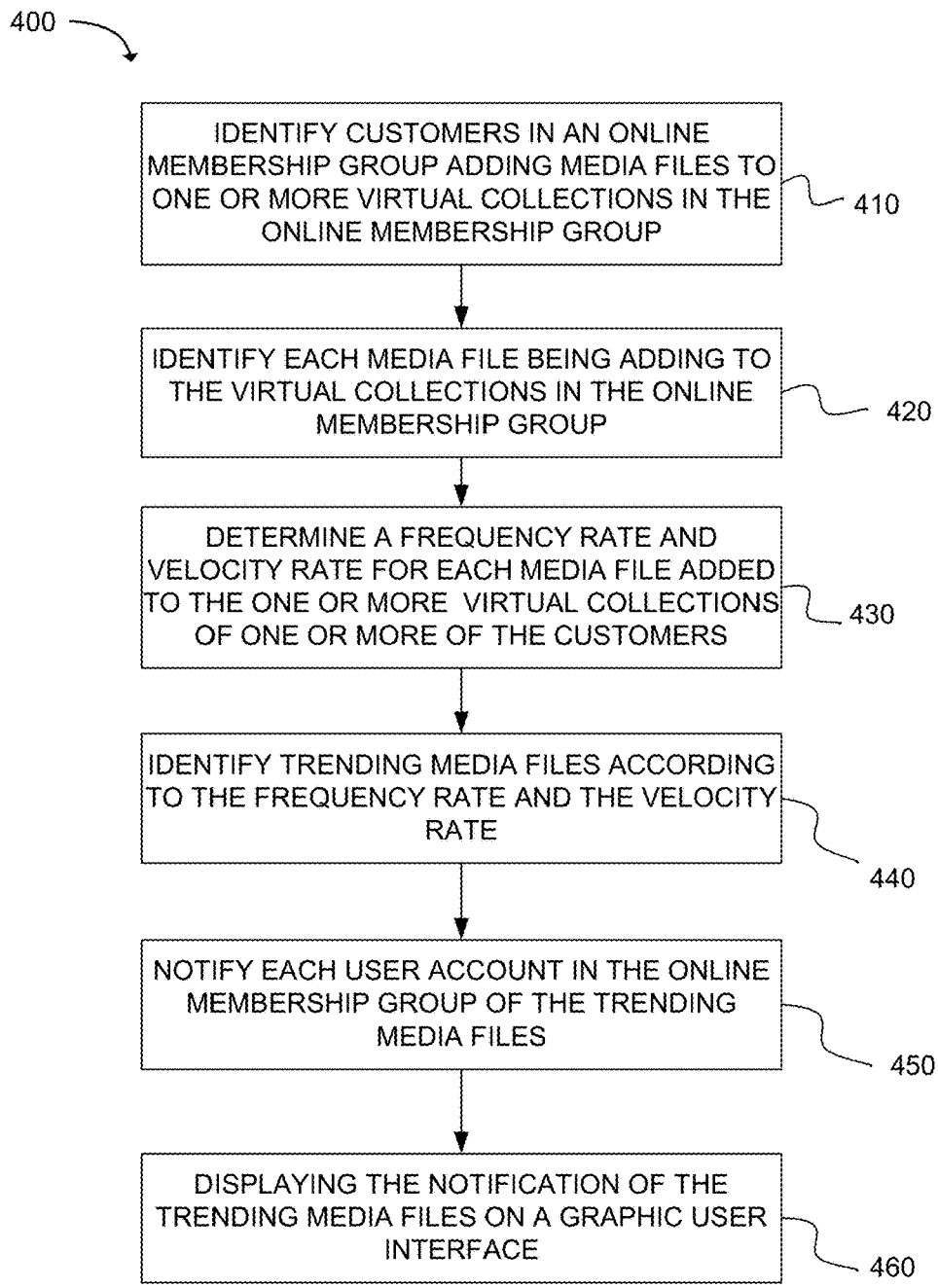
FIG. 4 is a flowchart of an example method for identifying trending media content in an online membership group according to an example of the present technology.

FIG. 4 is a flowchart of an example method for the presentation of trending media content in an online membership group according to an example of the present technology. The functionality can be implemented as a method or the functionality can be executed as instructions on a machine, where the instructions are included on at least one computer readable medium or one non-transitory machine-readable storage medium. One or more customers may be identified in an online membership group as adding media files to a media library, such as a virtual collection, in the online membership group, as in step 410. Each media file being added during one or more predetermined time periods to the virtual collections may be identified, as in step 420. A frequency rate and a velocity rate may be determined for each media file added to one or more virtual collections in the online membership group, as in step 430. For example, a recently released song by a famous music artist may have been recently released for public consumption. The online membership group may offer access to the song for each customer in the online membership group. During a predetermined time period, such as an hour after release of the song to the online membership group, at least one-quart (25%) of the customers may add the song to the customer's media library. The rate or "frequency rate" may be calculated for this song as it is added to each media library. However, as compared to other songs, the velocity rate of the song added to the media library during the predetermined time period may also be determined. In one aspect, the velocity rate may indicate a value, such as on a scale of 1 through 100, of 95 indicating the velocity rate is being added faster in time as compared to other songs, such as a song having a 5 on the scale, for indicating the popularity of the song. In one aspect, higher velocity rates, such as on the scale of 1 through 100, indicate more popular songs. In other words, the rate of change at which a song is being added to a virtual collections is greater and faster than slower rates of change for other songs being added (or not added at all) during a predetermined time. It should be note that the rate of change may be based on the scale described above, based on a ratio of number of times added divided by the total time (e.g., 100 times added to one or more virtual collects/60 second time interval), and/or other method for detecting a rate of change.

Trending media files may be identified according to the frequency rate and the velocity rate, as in step 440. For example, each song added may have a frequency rate and a velocity rate. Each frequency rate may represent the number of times a song has been added to the library and the velocity rate may indicate how fast the song is being added by one or more customers during the predetermined time period). Songs having a larger or "faster" frequency rate as compared to smaller or "slower" frequency rate are determined as popular or "now trending" during the predetermined time period. Songs having a larger or "faster" velocity rate as compared to smaller or "slower" velocity rate are determined as popular or "now trending" during the predetermined time period. Songs having a larger or "faster" velocity rate as compared to smaller or "slower" frequency rate are determined as popular or "now trending" during the predetermined time period.

One or more customers in the online membership group may be notified of the trending media files, as in step 450. Finally, the notification of the trending media files may be displayed in a graphical user interface, as in step 460. For example, once the more popular and/or trending media files have been determined according to the frequency rates, a content site, accessed via a browser, may include a display control for displaying the notification on the content site associated with a customer.

Figure 5:
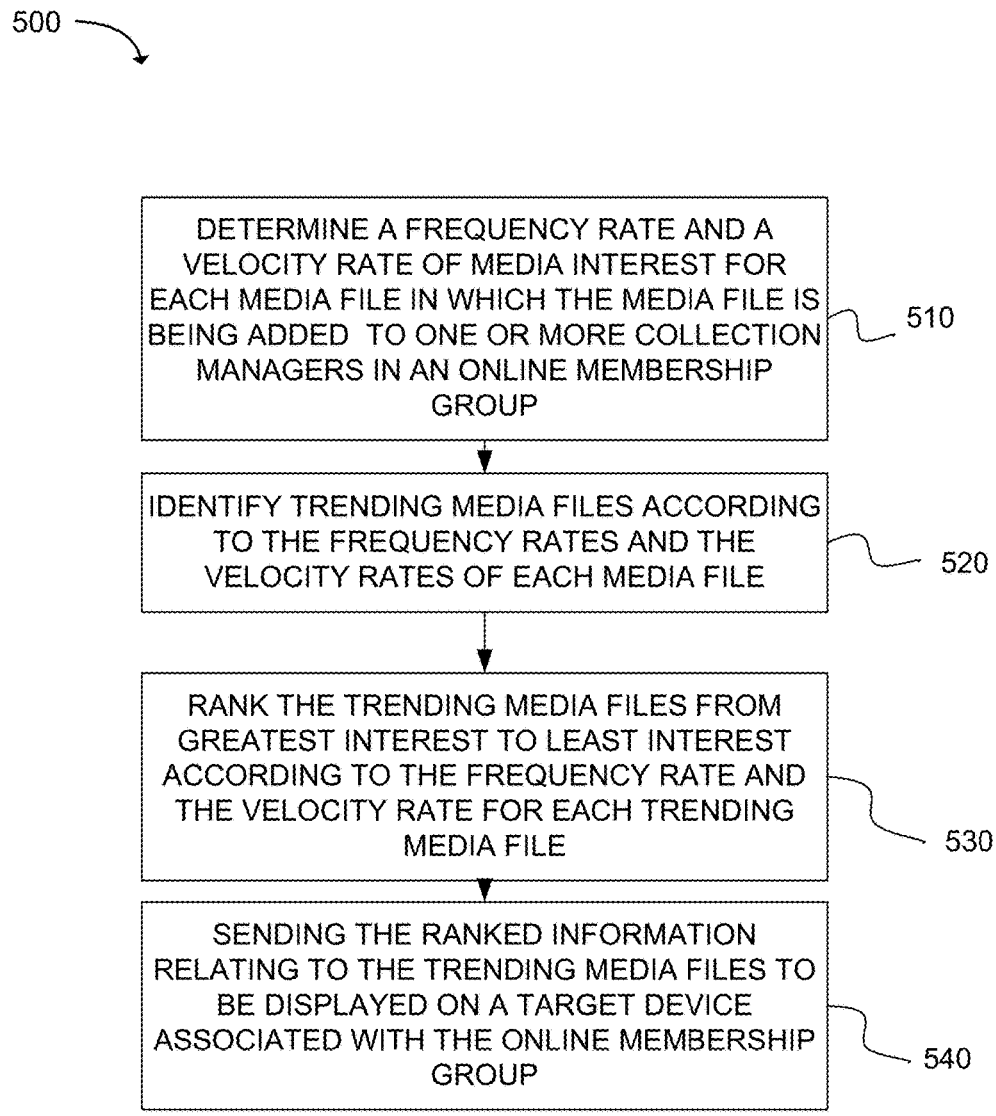
FIG. 5 is a flowchart of an example method for displaying trending media content for an online membership group on a graphical user interface according to an example of the present technology.

FIG. 5 is a flowchart of an example method for displaying trending media content for an online membership group on a graphical user interface according to an example of the present technology. The functionality can be implemented as a method or the functionality can be executed as instructions on a machine, where the instructions are included on at least one computer readable medium or one non-transitory machine-readable storage medium. A frequency rate and a velocity rate of media interest for each media file may be determined in which each media file is being added to one or more collection managers in an online membership group, as in step 510.

Trending media files (e.g., media files determined as popular or "now trending" having a larger or faster frequency rate) are identified according to the frequency rate and velocity rate for each of the media files, as in step 520. For example, a song may have a faster or larger frequency rate and/or velocity rate based on the song 1) being added more times to one or more customer's media library as compared to other songs in a data store, 2) the velocity rate at which the song is being added to one or more media library is faster as compared to other songs in a data store being added to one or more media library, and/or 3) a larger or faster activity increase is detected for one or more songs being added to a customer's library as compared to other songs being added to one or more media libraries.

The trending media files may be ranked from greatest interest to least interest according to the frequency rate and the velocity rate for each trending media file, as in step 530. Finally, the ranked information relating to the trending media files may be sent to one or more members in the online membership group to be displayed on a target device associated with the online membership group, as in step 540.

Figure 6:
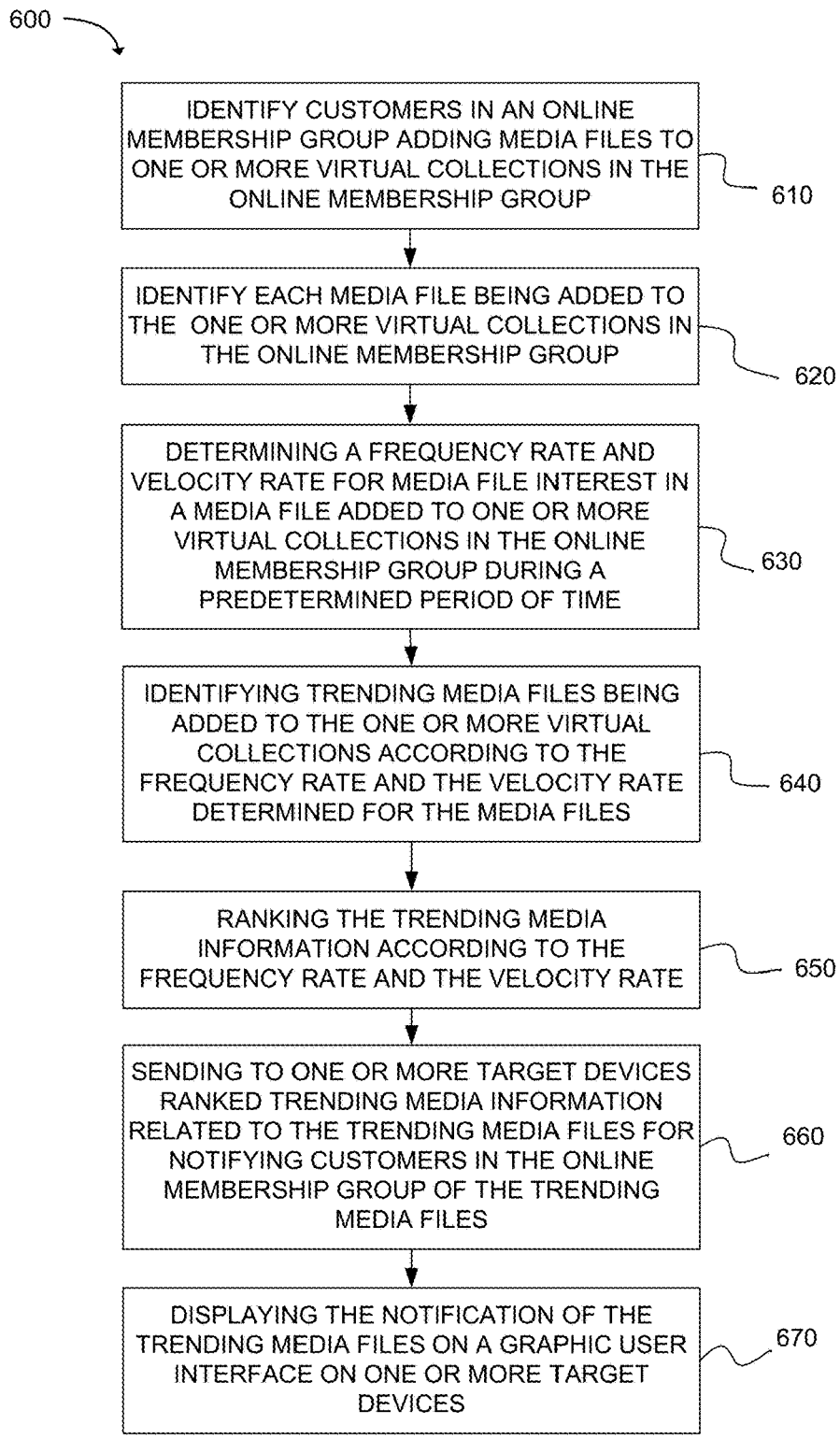
FIG. 6 is a flowchart of an example method for displaying trending media content for an online membership group according to an example of the present technology.

FIG. 6 is a flowchart of an example method for displaying trending media content for an online membership group according to an example of the present technology. The functionality can be implemented as a method or the functionality can be executed as instructions on a machine, where the instructions are included on at least one computer readable medium or one non-transitory machine-readable storage medium. One or more customers may be identified in an online membership group adding media files to one or more virtual collections, as in step 610. Each media file being added during one or more predetermined time periods may be identified, as in step 620. A frequency rate and velocity rate for media file interest may be determined for each a media file added to one or more virtual collections in the online membership group during a predetermined period of time, as in step 630.

Trending media files being added to the one or more virtual collections may be identified according to the frequency rate and/or the velocity rate determined for the media files, as in step 640. The trending media information may be ranked according to the frequency rate and the velocity rate, as in step 650. The ranked trending media information related to the trending media files may be sent to a target device in the online membership group for notifying a customer in the online membership group of the trending media files, as in step 660. Finally, the notification of the trending media files may be displayed in at least one of a content site, a display ticker, a pop-up window, a ranked listing control, or a short message service (SMS) message, such as on a graphic user interface, on the multiple target devices, as in step 670. For example, once the more popular and/or trending media files have been determined according to the frequency rates and/or velocity rates, a content site may include GUI, such as a display ticker or dynamic list, for displaying the notification on the content site associated with a customer, such as in a customer online membership group account.

Figure 7:
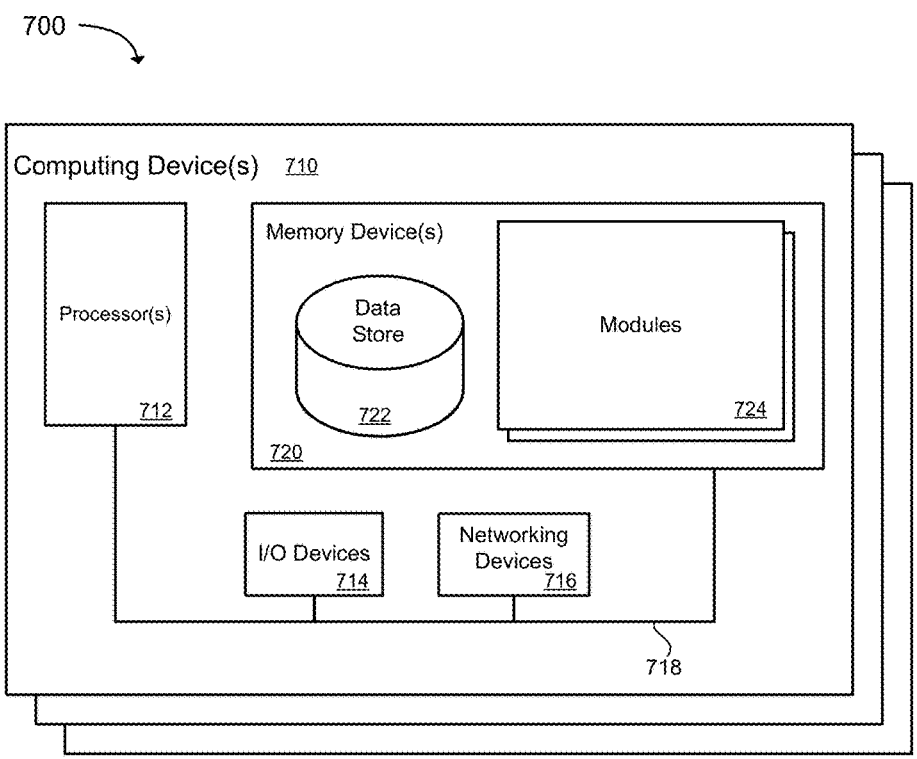
FIG. 7 is a block diagram that provides an example illustration of a computing device that may be employed in the present technology.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device may include a local communication interface 718 for the components in the computing device. For example, the local communication interface may be a local data bus and/or any related address or control busses as may be desired.

The memory device 720 may contain modules 724 that are executable by the processor(s) 712 and data for the modules 724. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. An example of an I/O device is a display screen that is available to display output from the computing devices. Other known I/O device may be used with the computing device as desired. Networking devices 716 and similar communication devices may be included in the computing device. The networking devices 716 may be wired or wireless networking devices that connect to the Internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid-state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for sharing trending media content within an online membership group, the method comprises:
   under control of one or more computer systems configured with executable instructions:
   determining a frequency rate and velocity rate for media file interest for each media file added to one or more virtual collections in the online membership group during a predetermined period of time, wherein each of the one or more virtual collections is associated with a user account belonging to the online membership group, wherein the media file is added to a virtual collection from a media data store based on a command sent from a device to a media server associated with the media data store, and the user account is duplicated to a digital rights management service associated with the media data store to provide customer provided credentials for accessing the media data store, wherein the determining the frequency rate and the velocity rate for the media file interest further comprises detecting an activity increase in the frequency rate and the velocity rate for the media file being added to the one or more virtual collections;
   identifying trending media files, via the media server, according to the frequency rate and the velocity rate determined for each media file added to the one or more virtual collections during the predetermined period of time compared to at least one other predetermined time, wherein the velocity rate is a rate of change that the media file is being added to the one or more virtual collections during the predetermined time period; and
   sending ranking information for the trending media files to be displayed on a graphical user interface (GUI) for the one or more virtual collections in the online membership group, wherein the ranking information is based on ranking factors comprising the frequency rate and the velocity rate, and the GUI is configured to display the ranking information in a viewing arrangement based on a priority dictated by a display preference received via a GUI control.

2. The method of claim 1, further comprises displaying the ranking information relating to the trending media in at least one of a display ticker, a pop-up window, a short message service (SMS) message or a ranked listing on the GUI, the display ticker, the pop-up window, the SMS message or the ranked listing being configured to display the ranking information relating to the trending media files in one of a plurality of presentations.

3. A computer-implemented method, the method comprising:
   under control of one or more computer systems configured with executable instructions:
   determining a frequency rate or velocity rate for media file interest in a media file added to one or more media collection managers associated with an online membership group, wherein the one or more media collection managers are virtual collections and are associated with user accounts belonging to the online membership group, wherein the media file is added to a media collection manager from a media data store based on a command sent from a device to a media server associated with the media data store, and the user accounts are duplicated to a digital rights management service associated with the media data store to provide customer provided credentials for accessing the media data store, wherein the determining the frequency rate and the velocity rate for the media file interest further comprises detecting an activity increase in the frequency rate and the velocity rate for the media file being added to the one or more virtual collections;
   identifying trending media files, via the media server, according to the frequency rate and the velocity rate being added to the one or more media collection managers according to the frequency rate determined for each media file during a predetermined period of time compared to at least one other predetermined time period, wherein the velocity rate is a rate of change that the media file is being added to the one or more media collection managers during the predetermined time period;
   ranking the trending media files from greatest interest to least interest according to the frequency rate or the velocity rate for each trending media file; and
   sending ranked information relating to the trending media files associated with the online membership group to be displayed on a graphical user interface (GUI), wherein the ranked information is based on ranking factors comprising the frequency rate and the velocity rate, and the GUI is configured to display the ranking information in a viewing arrangement based on a priority dictated by a display preference received via a GUI control.

4. The method of claim 3, further comprising associating the one or more media collection managers of the online membership group with a social media network.

5. The method of claim 3, further comprising detecting an activity increase in one of the frequency rate and the velocity rate for the media file being added to the one or more media collection managers associated with the online membership group.

6. The method of claim 5, further comprising collecting the frequency rate and the velocity rate calculated for each media file added to the one or more media collection managers associated with the online membership group.

7. The method of claim 6, further comprising creating a list of ranked frequency rates and the velocity rates from each frequency rate and each velocity rate that that has been collected.

8. The method of claim 3, further comprising alerting at least one member in the online membership group of the trending media files being added to the one or more media collection managers.

9. The method of claim 3, further comprising identifying media files having the velocity rate greater during a current predetermined time period than the velocity rate during one or more previous time periods in order to define the trending media files.

10. The method of claim 3, further comprising identifying media files having the frequency rate during a current predetermined time period greater than the velocity rate during one or more previous time periods in order to define the trending media files.

11. The method of claim 3, further comprising labeling at least one media file as a trending media item for at least one media file having a larger activity increase in a rate of change of one of the frequency rate or the velocity rate as compared to an alternative media file having a smaller activity increase in the rate of change of one of the frequency rate or the velocity rate.

12. The method of claim 11, further comprising sending to at least one customer in the online membership group information related to the media files labeled as the trending media item.

13. The method of claim 3, further comprising displaying information relating to trending media files in at least one of a content site, a display ticker, a pop-up window, or a short message service (SMS) message.

14. The method of claim 13, further comprising displaying information relating to media files being added to the one or more media collection managers and information relating to the trending media files in at least one of the content site, the display ticker, the pop-up window, or the short message service (SMS) message.

15. The method of claim 13, further comprising displaying the information relating to the trending media files in at least one of the content site, the display ticker, the pop-up window, or the SMS message according to at least a time period, a region, or user profile data.

16. The method of claim 13, further comprising displaying in at least one of the content site, the display ticker, the pop-up window, or the SMS message, the information relating to at least one media file labeled as a trending media item having a larger activity increase in a rate of change of one of the frequency rate or the velocity rate as compared to an alternative media file having a smaller activity increase in the rate of change of one of the frequency rate or the velocity rate.

17. The method of claim 3, further comprising adding a media file to one or more media collection managers in the online membership group by at least one of purchasing, downloading, or uploading.

18. A method for displaying trending media content for an online membership group on multiple target devices, the method comprises:

under control of one or more computer systems configured with executable instructions:

determining a frequency rate and velocity rate for media file interest in a media file added to one or more virtual collections in the online membership group during a predetermined period of time, wherein the one or more virtual collections are associated with user accounts belonging to the online membership group, wherein the media file is added to a virtual collection from a media data store based on a command sent from a device to a media server associated with the media data store, wherein the user accounts are duplicated to a digital rights management service associated with the media data store to provide customer provided credentials for accessing the media data store;

identifying trending media files, via the media server, being added to the one or more virtual collections according to the frequency rate and the velocity rate determined for the media files during the predetermined period of time compared to at least one other predetermined time period wherein the velocity rate is a rate of change that the media file is being added to the one or more virtual collections during the predetermined time period;

detecting an activity increase in one of the frequency rate and the velocity rate for the media file being added to the one or more virtual collections associated with the online membership group;

ranking the trending media information according to the frequency rate and the velocity rate; and sending ranked trending media information related to the trending media files to a target device for notifying a user account in the online membership group about the trending media files on a graphical user interface (GUI), wherein the ranked media information is based on ranking factors comprising the frequency rate and the velocity rate, and the GUI is configured to display the ranked media information in a viewing arrangement based on a priority dictated by a display preference received via a GUI control.

\* \* \* \* \*